Dec. 21, 1965  J. H. RICHTER  3,224,081
METHOD OF FORMING A SHELF
Filed Aug. 20, 1962  6 Sheets-Sheet 1
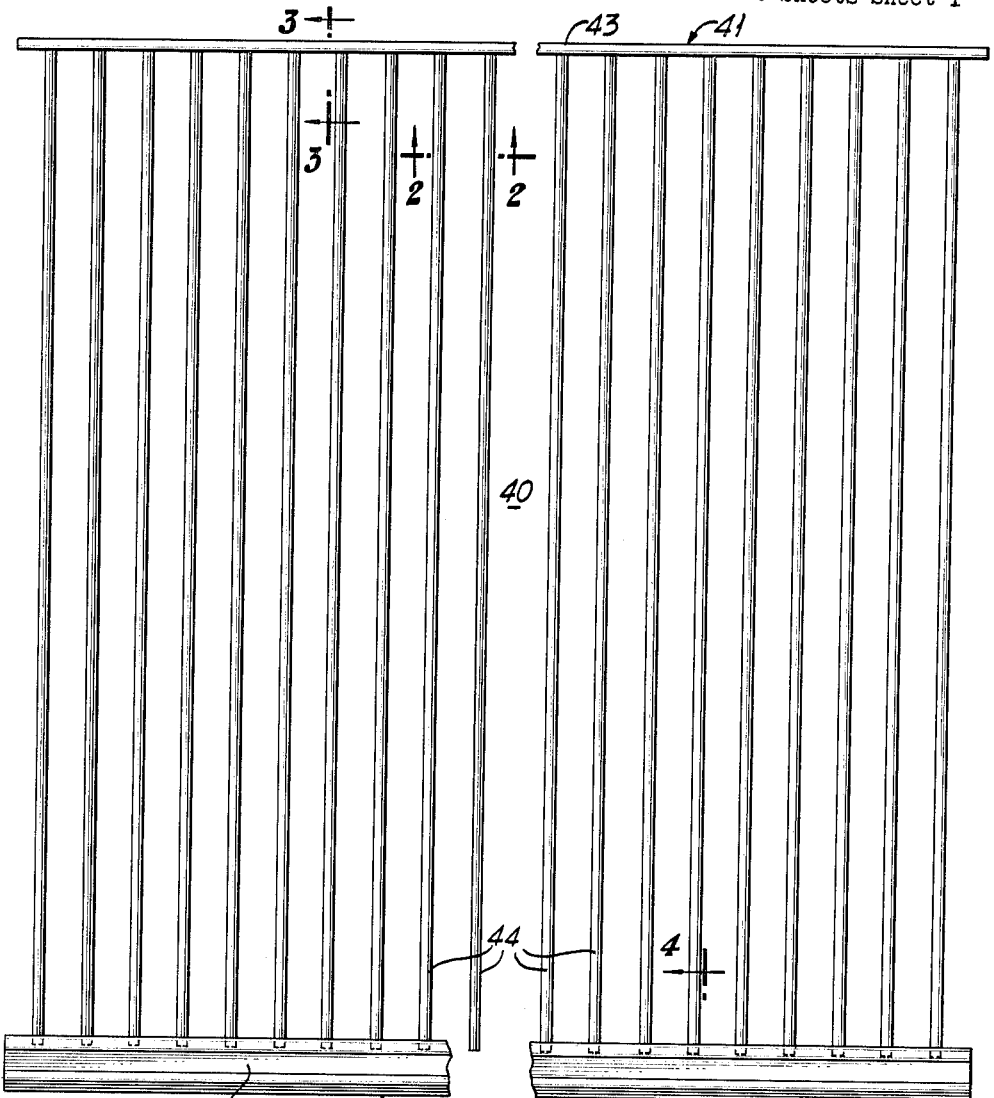
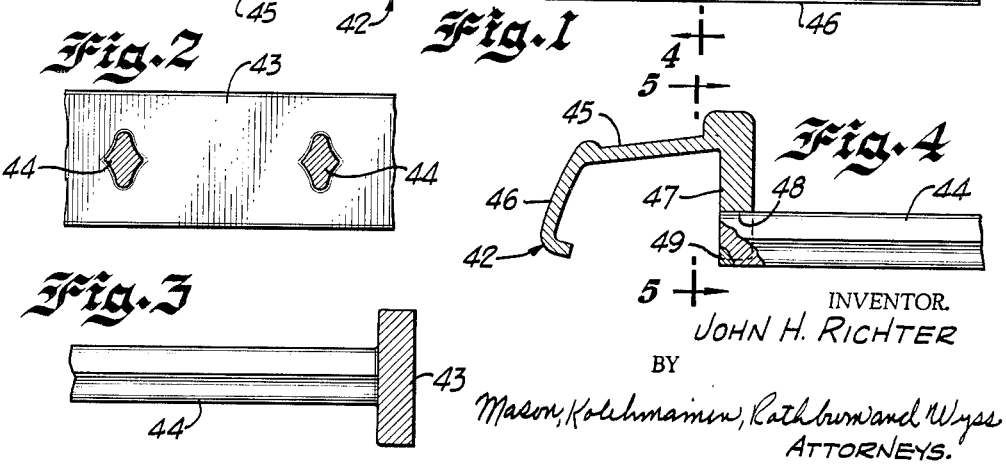
INVENTOR.
JOHN H. RICHTER
BY
Mason, Kolehmainen, Rathburn and Wyss
ATTORNEYS.

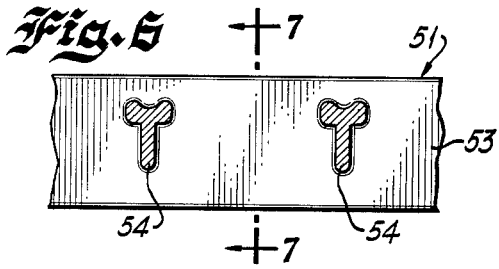
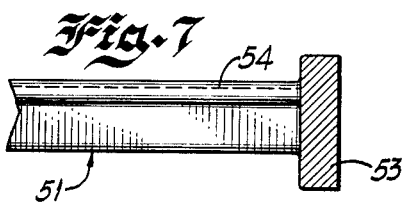
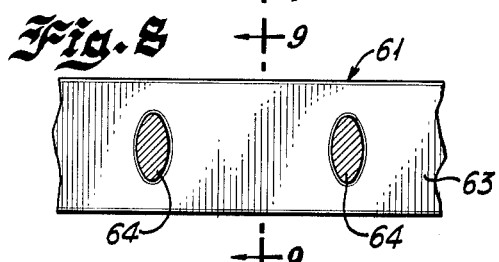
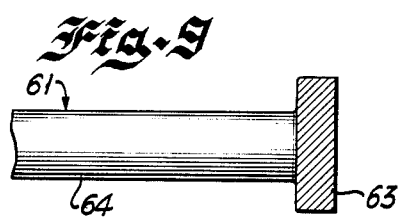
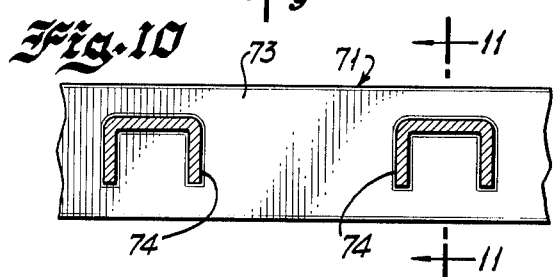
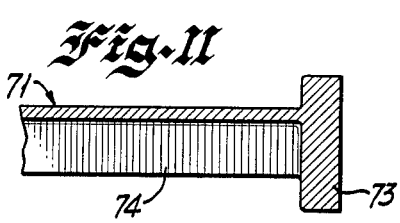
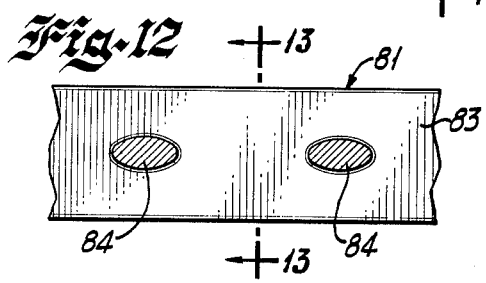
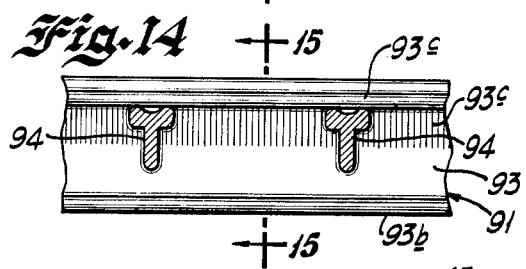
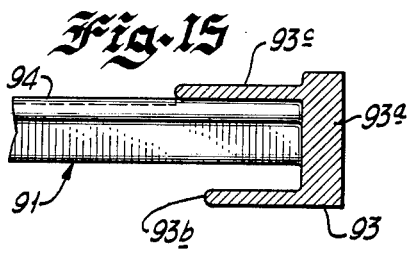
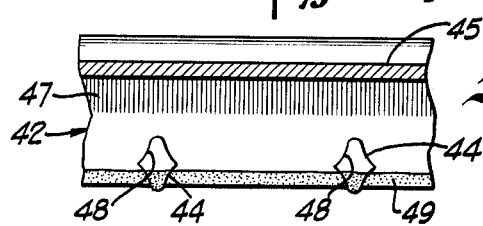

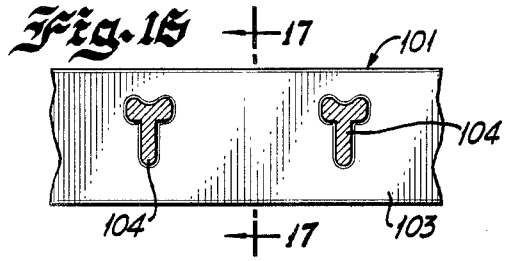
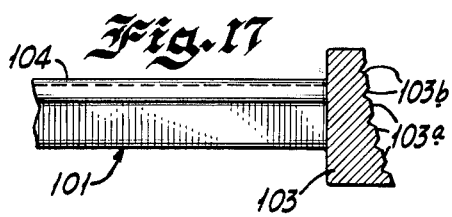
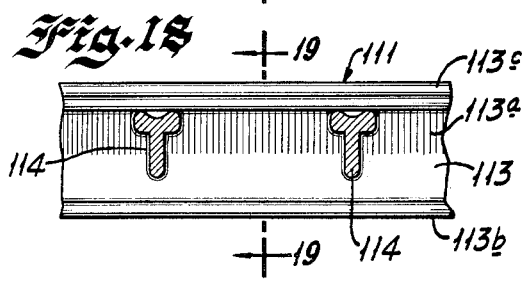
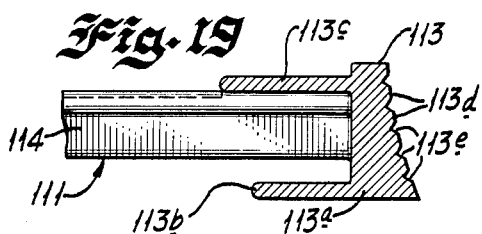
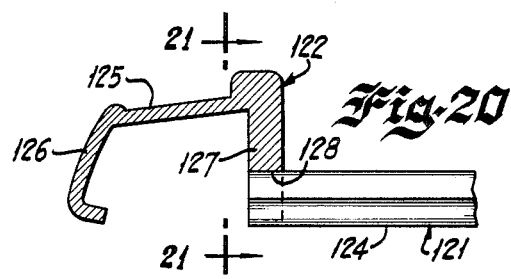
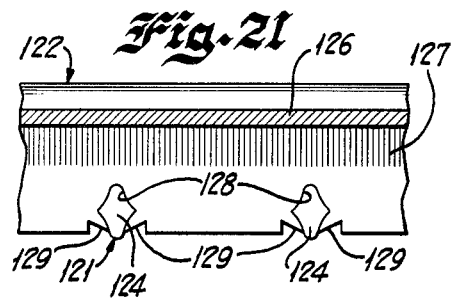
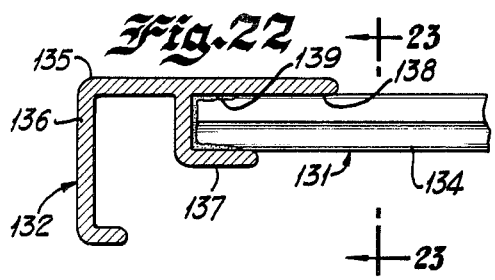
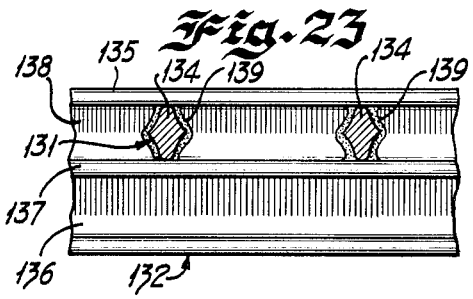
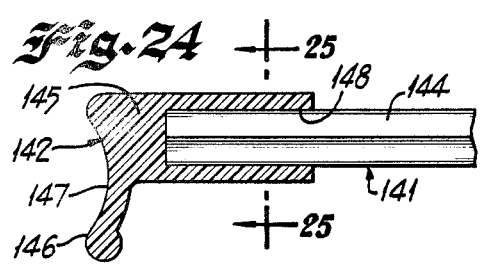
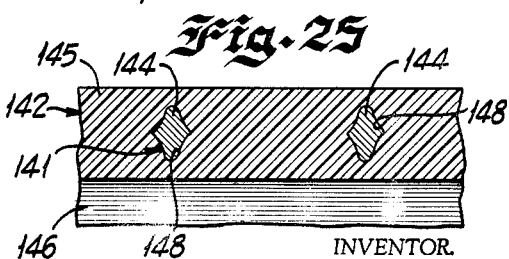

Dec. 21, 1965   J. H. RICHTER   3,224,081
METHOD OF FORMING A SHELF
Filed Aug. 20, 1962   6 Sheets-Sheet 4
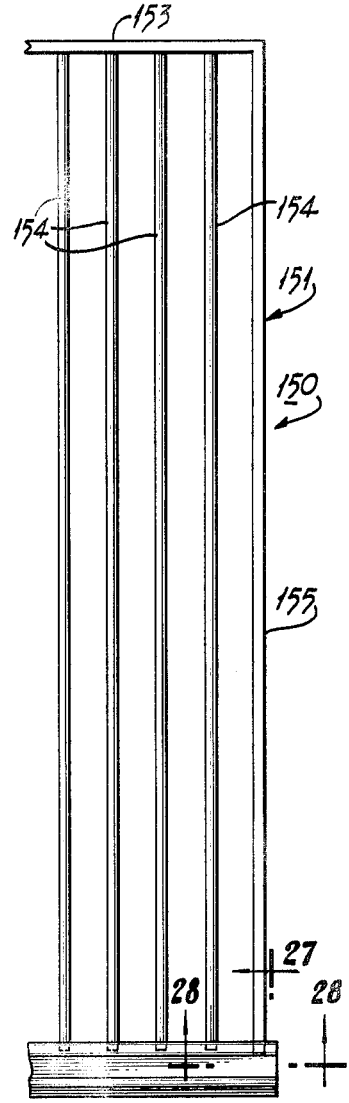
Fig. 28
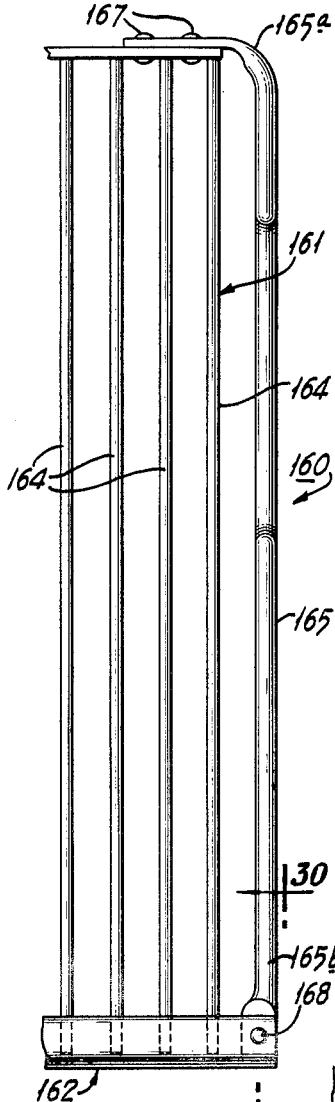
Fig. 29
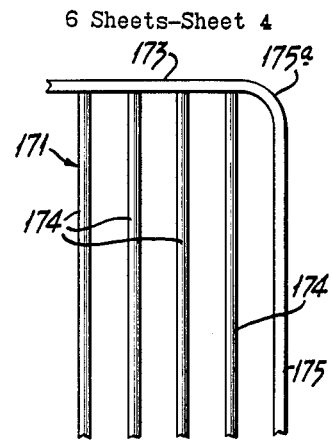
Fig. 31
Fig. 30
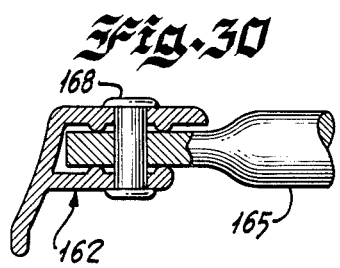
Fig. 28
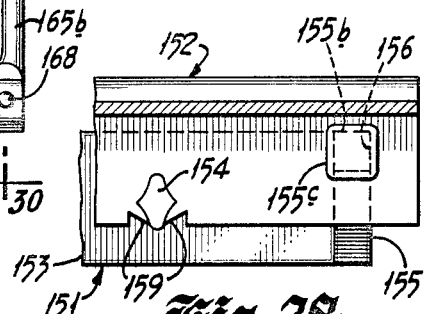
Fig. 27
INVENTOR.
JOHN H. RICHTER
BY
Mason, Kolehmainen, Rathburn and Wyss.
ATTORNEYS.

Dec. 21, 1965  J. H. RICHTER  3,224,081
METHOD OF FORMING A SHELF
Filed Aug. 20, 1962  6 Sheets-Sheet 5

INVENTOR.
JOHN H. RICHTER
BY
Mason, Kolehmainen, Rathburn and Wyss.
ATTORNEYS

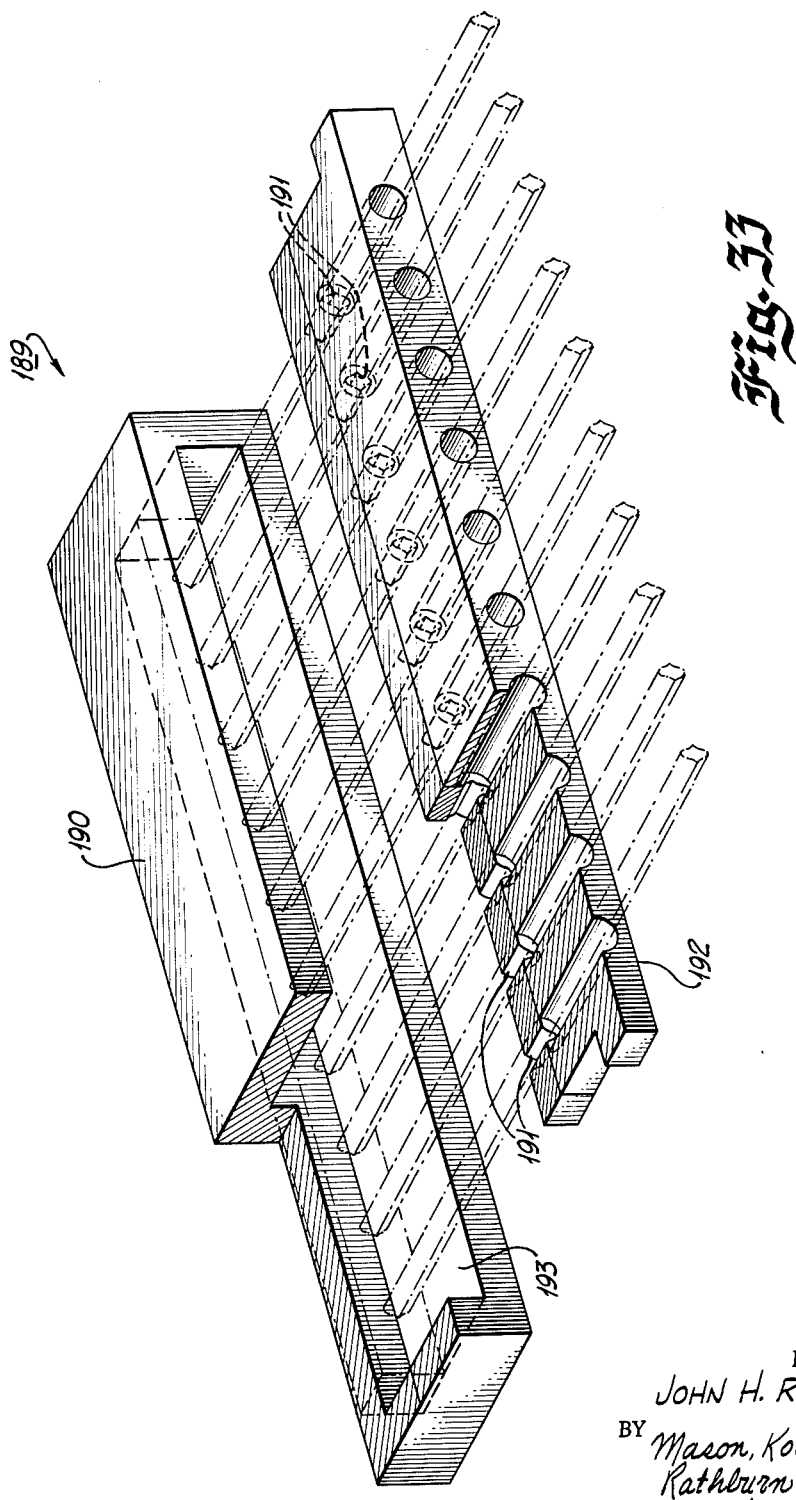

United States Patent Office 3,224,081
Patented Dec. 21, 1965

3,224,081
METHOD OF FORMING A SHELF
John H. Richter, Cynthiana, Ky., assignor to American Metal Climax, Inc., a corporation of New York
Filed Aug. 20, 1962, Ser. No. 217,939
4 Claims. (Cl. 29—160)

This invention relates to an extruded member such as a shelf and to a method of forming the same, and particularly to a refrigerator shelf and the like which may be quickly and economically manufactured and assembled with a minimum of component parts, and to an improved method of forming the shelf. More broadly, the invention relates to extruded members having a series of portions integrally connected to a common portion, and to a method of forming the same.

Refrigerator shelves of the type having crossbars or wires extending between side frame members heretofore have been fabricated from individually cut wire and frame sections to form the shelf. The components of the shelf may be secured together mechanically, by welding, or in any other suitable manner. However, the manufacture and fabrication of a large number of parts in a single shelf has added appreciably to the cost of a completed shelf while limiting design possibilities and imposing other limitations. Moreover, prior methods of shelf fabrication did not lend themselves to the use of pre-anodized aluminum.

It is, therefore, an object of the present invention to provide a new and improved refrigerator shelf which may be formed of pre-anodized aluminum components.

It is yet another object of the present invention to provide a new and improved method of forming an extruded member such as a shelf and the like.

A further object of the present invention is to provide a new and improved method of forming a refrigerator shelf and the like which overcomes the above-mentioned difficulties, and which may be readily and inexpensively manufactured.

Further objects and advantages of the present invention will become apparent as the following description proceeds and the features of novelty which characterize the invention will be pointed out with particularity in the claims annexed to and forming a part of this specification.

In accordance with these and other objects, there is provided an improved extruded member having a series of portions integrally connected to a common portion. In a specific embodiment of the invention, there is provided an improved shelf for a refrigerator and the like comprising an extruded portion including a frame member and a plurality of shelf wires, each having one end integrally joined with the frame member. Another frame member is secured to the other ends of the shelf wires in any suitable manner such as mechanically or by welding. The extruded portion may be impact-extruded either hot or cold from any suitable extrudable metal such as aluminum. The billet from which the extruded member is formed is pre-cut to the desired size and the billet butt forms the frame member of the extruded portion.

According to certain embodiments of the present invention, end frame members may be provided. In one embodiment, the end frame members are impact-extruded integrally with the remainder of the extruded portion. In another embodiment, the end frame members are mechanically secured to the side frame members.

The invention also relates to an improved method of forming the extruded member and includes the forming of an elongated metal billet of aluminum or other impact-extrudable metal to a predetermined size. In a specific embodiment the billet is inserted in the chamber of an impact-extrusion press with a die provided with a plurality of die cavities for forming the wires of the shelf. An impact ram is provided in the extrusion press to extrude the wires and simultaneously with the impact of the ram to forge the frame member from the remaining portion of the billet. The frame member is thus formed in a quasi-forging process in the chamber of the impact-extrusion press. The extruded portion is then removed from the press and the remaining frame members are secured thereto in any suitable manner.

For a better understanding of the present invention, reference may be had to the accompanying drawings, wherein:

FIG. 1 is a plan view of an improved refrigerator shelf according to the present invention;

FIG. 2 is a fragmentary cross-sectional view of the shelf of FIG. 1, taken along line 2—2 of FIG. 1, and drawn to a larger scale than FIG. 1;

FIG. 3 is a fragmentary cross-sectional view of the shelf of FIG. 1, taken along the line 3—3 of FIG. 1, and drawn to the same scale as FIG. 2;

FIG. 4 is a fragmentary cross-sectional view of the shelf of FIG. 1, taken along the line 4—4 of FIG. 1, and drawn to the same scale as FIGS. 2 and 3;

FIG. 5 is a fragmentary cross-sectional view of the shelf of FIG. 1, taken along the line 5—5 of FIG. 4;

FIG. 6 is a fragmentary cross-sectional view of the shelf according to another embodiment of the present invention, and illustrating a modified form of extruded shelf wires;

FIG. 7 is a fragmentary cross-sectional view of the shelf of FIG. 6, taken along the line 7—7 of FIG. 6;

FIG. 8 is a fragmentary cross-sectional view of a shelf acording to another embodiment of the present invention and illustrating yet another modified form of shelf wire;

FIG. 9 is a fragmentary cross-sectional view of the shelf of FIG. 8, taken along the lines 9—9 of FIG. 8;

FIG. 10 is a fragmentary cross-sectional view of a shelf according to yet another embodiment of the present invention and illustrating another modified form of shelf wire;

FIG. 11 is a fragmentary cross-sectional view of the shelf of FIG. 10 taken along line 11—11 of FIG. 10;

FIG. 12 is a fragmentary cross-sectional view of a shelf according to yet another embodiment of the present invention and illustrating a modified form of shelf wire;

FIG. 13 is a fragmentary cross-sectional view of the shelf of FIG. 10 taken along line 13—13 of FIG. 12;

FIG. 14 is a fragmentary cross-sectional view of a shelf according to yet another embodiment of the present invention and illustrating a modified form of an integrally formed side frame member;

FIG. 15 is a fragmentary cross-sectional view of the shelf of FIG. 14 taken along line 15—15 of FIG. 14;

FIG. 16 is a fragmentary cross-sectional view of a shelf according to another embodiment of the present invention and illustrating another modified form of an integrally formed side frame member;

FIG. 17 is a fragmentary cross-sectional view of the shelf of FIG. 16, taken along line 17—17 of FIG. 16;

FIG. 18 is a fragmentary cross-sectional view of a shelf according to yet another embodiment of the present invention illustrating yet another modified form of an integrally formed side frame member;

FIG. 19 is a fragmentary cross-sectional view of the shelf of FIG. 18, taken along line 19—19 of FIG. 18;

FIG. 20 is a fragmentary cross-sectional view of another embodiment of a shelf according to the present invention and illustrating a modified form of fastening a side frame member to the extruded shelf wires;

FIG. 21 is a fragmentary cross-sectional view of the shelf of FIG. 20, taken along line 21—21 of FIG. 20;

FIG. 22 is a fragmentary cross-sectional view of a shelf according to yet another embodiment of the present invention and illustrating a modified manner of connecting the side frame member to the extruded shelf wires;

FIG. 23 is a fragmentary cross-sectional view of the shelf of FIG. 22, taken along line 23—23 of FIG. 22;

FIG. 24 is a fragmentary cross-sectional view of a shelf according to yet another embodiment of the present invention and illustrating yet another modified form of securing a side frame member to the extruded shelf wires;

FIG. 25 is a fragmentary cross-sectional view of the shelf of FIG. 24, taken along line 25—25 of FIG. 24;

FIG. 26 is a fragmentary plan view of a modified refrigerator shelf according to yet another embodiment of the present invention and illustrating an end frame member extruded simultaneously with the shelf wires;

FIG. 27 is a fragmentary cross-sectional view of the shelf of FIG. 26, taken along line 27—27 of FIG. 26, drawn to a larger scale, and illustrating the method of attachment of the integrally extruded side frame member to the extruded end frame members;

FIG. 28 is a fragmentary cross-sectional view of the shelf of FIG. 26, taken along line 28—28 of FIG. 26, drawn to the same scale as FIG. 27, and illustrating a manner of attaching the extruded wires and end frame member to the side frame member;

FIG. 29 is a fragmentary plan view of a shelf according to yet another embodiment of the present invention and illustrating another form of end frame member;

FIG. 30 is a fragmentary cross-sectional view of the shelf of FIG. 29, taken along line 30—30 of FIG. 29, drawn to a larger scale, and illustrating a modified manner of attaching the end frame member to the side frame member;

FIG. 31 is a fragmentary plan view of a refrigerator shelf according to yet another embodiment of the present invention;

FIG. 33 is a somewhat schematic view of a modified form of impact-extrusion press according to another embodiment of the present invention.

Figure 32:
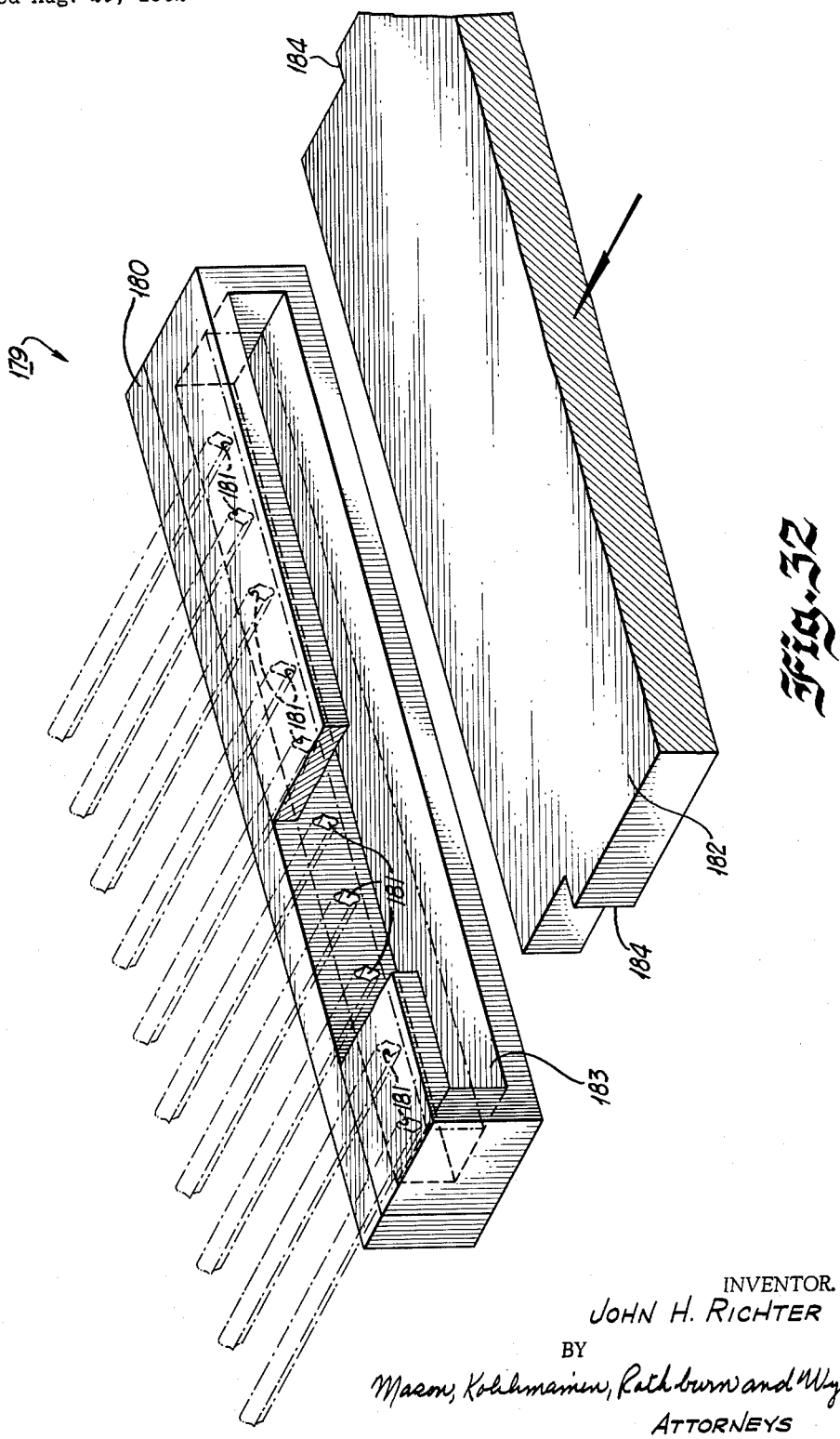
FIG. 32 is a somewhat schematic view of an impact-extrusion press illustrating the method of impact-extruding an integral side frame member and shelf wires.

Referring now to the drawings, and particularly to the embodiment of FIGS. 1 to 5, there is illustrated an improved extruded member, here shown as a shelf 40 suitable for use as a fixed or sliding shelf in a refrigerator or similar application. The shelf 40 is formed of an impact-extruded portion 41 of aluminum or other suitable extrudable material, and a rectangular side frame member 42 rigidly and fixedly secured thereto. The extruded portion 41 includes an elongated side frame member 43 and a plurality of spaced, parallel, thin extruded crossbar or shelf wires 44 which may have any desired shape but which, as best illustrated in FIGS. 2 and 5, are somewhat diamond shape with the vertical edges thereof generally rounded. Although either frame member 42 or 43 may form the front and rear of the shelf, respectively, depending on the design of the frame member, in the embodiment of FIGS. 1 to 5, the frame member 42 will be referred to as the front frame member and the frame member 43 as the rear frame member. The shelf wires 44 are formed integrally with the rear member 43 and extend generally perpendicularly therefrom. The front frame member 42 may likewise have any desired shape but, as illustrated in the embodiments of FIGS. 1 to 5, is generally of inverted U-shape, as best shown in FIG. 4, and includes a generally horizontal bight portion 45 interconnecting a pair of spaced downwardly extending side legs 46 and 47.

The free ends of the shelf wires 44 may be secured to the front frame member 42 in any suitable manner. As herein illustrated, and as best shown in FIGS. 4 and 5, the side leg 47 of the front frame member 42 is provided with a plurality of notches or recesses 48 extending inwardly from the edge thereof and conforming to the general outline of the shelf wires 44 to partially accommodate a shelf wire 44 a predetermined distance within the notch 48 with a portion of the shelf wires 44 extending below the lower edge of the side leg 47. A welding bead 49 is run along the lower edge of the side leg 47 and the ends of the shelf wires 44 thereby to fixedly secure the shelf wires 44 with the front member 42. Advantageously, the side frame members 42 and 43 extend upwardly from the plane of the shelf wires 44 to provide an edge along the shelf which will prevent articles from sliding off the shelf.

The shelf wires may have any suitable shape and in the embodiment of FIGS. 6 and 7, there is fragmentarily illustrated a refrigerator shelf formed with and extruded portion 51 including a generally rectangular rear frame member 53 and a plurality of thin shelf wires 54 extending integrally therefrom having the general shape of a T.

In the embodiment of FIGS. 8 and 9 there is illustrated a modified shelf according to the present invention including an extruded portion 61 formed with a generally rectangular rear frame member 63 and including a plurality of extruded shelf wires 64 integrally projecting from the frame member 63. As best illustrated in FIG. 8, the shelf wires 64 are generally oval in cross section with the major axis thereof vertical.

FIGS. 10 and 11 illustrate a shelf wherein the shelf wires are of generally inverted U-shape. Specifically, there is illustrated a portion of a shelf including an extruded portion 71 having a generally rectangular rear frame member 73 and a plurality of shelf wires 74 integrally extruded from the rear frame member 73.

There is fragmentarily illustrated in FIGS. 12 and 13 an improved refrigerator shelf including an extruded portion 81 formed with a generally rectangular rear frame member 83 and a plurality of shelf wires 84 integrally extruded therefrom. As best illustrated in FIG. 12, the shelf wires 84 are of oval cross section, but differ from the embodiment of FIGS. 8 and 9 in that the major axis thereof is horizontal.

Although the rear frame members formed in the extruded portions heretofore described have been rectangular in cross section, the shelf according to the present invention may be formed with various shaped extruded side frame members. For example, in the embodiment of FIGS. 14 and 15, there is fragmentarily illustrated a refrigerator shelf including an extruded portion 91 formed of a side frame member 93 and a plurality of integrally extruded shelf wires 94 of generally T-shape. As best shown in FIG. 15, the side frame member 93 is generally channel shape having a forward bight portion 93a and an upper and lower horizontally extending leg portion 93b and 93c, respectively, to give a decorative appearance to the side frame member 93.

FIGS. 16 and 17 fragmentarily illustrate in cross section a refrigerator shelf having a modified extruded portion 101 formed of a side frame member 103 and a plurality of integrally extruded shelf wires 104 of generally T-shape cross section. In the embodiment of FIGS. 16 and 17, the side frame member 103 has a slightly arcuate forward surface 103a inclined inwardly and downwardly and provided with a plurality of grooves 103b to provide a decorative appearance to the side frame member 93 of the refrigerator shelf.

Yet another modified form of side frame member is illustrated in the embodiment of FIGS. 18 and 19. As therein illustrated, there is fragmentarily shown in cross section a refrigerator shelf having an extruded portion 111 formed of a side frame member 113 and a plurality of integrally extruded shelf wires 114 of generally T-shape cross section. As best illustrated in FIG. 19, the side frame member 113 is of generally channel shape having a bight portion 113a inclined inwardly and downwardly and a pair of horizontal inwardly extending legs 113b and 113c. The forward edge of the side frame member 113 is slightly arcuate, as indicated at 113d and is provided with a plurality of longitudinally extending grooves 113e to provide a pleasing appearance to the shelf.

Although the embodiment of FIGS. 1 to 5 has been shown as utilizing a welding bead 49 to interconnect the shelf wires 44 thereof with the side frame member 42, it will be understood that other suitable means of fastening the separate side frame member may be utilized. For example, in the embodiment of FIGS. 20 and 21 there is fragmentarily illustrated in cross section a refrigerator shelf including an extruded portion 121 and a separate side frame member 122. The side frame member 122 may have any desired shape, and as herein illustrated is similar to the side frame member 42 illustrated in the embodiment of FIGS. 1 to 5 and is of generally inverted U-shape having a bight portion 125 and a pair of downwardly extending side legs 126 and 127. Moreover, the extruded portion 121 includes shelf wires 124 of any suitable cross section and here shown as being diamond-shape with the upper and lower corners somewhat rounded similar to the shelf wires 44 of the embodiment of FIGS. 1 to 5, and integrally connected with the side frame member 122. The lower edge of the side leg 127 is provided with a plurality of notches or recesses 128 conforming generally to the shape of the upper portion of the shelf wires 124 and partially receiving the ends of the shelf wires 124. Moreover, the lower edge of the side leg 127 is peened or crimped adjacent the shelf wires 124 as indicated at 129 to mechanically interlock the shelf wires 124 and the side frame member 122.

Another means of interconnecting the extruded portion and a separate side frame member is illustrated in the embodiment of FIGS. 22 and 23. As therein illustrated, there is fragmentarily shown in cross section a refrigerator shelf including an extruded portion 131 and a separate side frame member 132. The illustrated side frame member 122 is of somewhat angle shape having a horizontal leg 135 and a vertical leg 136. Moreover, a generally angle-shaped section 137 is connected to the inner surface of the horizontal leg 135 to form a channel portion 138 of suitable size to closely receive a plurality of shelf wires 134 forming a part of the extruded portion 131. The shelf wires 134 are secured within the channel 138 to the side frame member 132 by welding or bonding with a suitable adhesive, as indicated at 139, to join the extruded member 131 and the side frame member 132.

Yet another method of interconnecting the extruded member with a separate side frame member is illustrated in the embodiment of FIGS. 24 and 25. As therein illustrated, there is fragmentarily shown in cross section a refrigerator shelf including an extruded portion 141 and a separate side frame member 142. The side frame member 142 may have any suitable cross section and, as there indicated, is generally of angular cross section having a horizontally extending leg 145 and a vertically extending leg 146. Moreover, the forward edge of the side frame member 142 is generally arcuate, as indicated at 147, to provide a pleasing appearance to the side frame member 142. The extruded member includes a plurality of shelf wires 144 mechanically interconnected with the side frame member 142. The refrigerator shelf may readily be formed by casting or molding the side frame member 142, of the same or dissimilar material such as the illustrated plastic material, directly to the extruded portion 141.

Of course, it is to be understood that the side frame member 142 may be pre-formed and in order to join the side frame member 142 to the extruded portion 141, the horizontal leg 145 of the side frame member 142 is provided with a plurality of inwardly extending openings 148 conforming generally to the size and shape of the shelf wires 144, but slightly smaller in size to provide an interfering fit therewith. The shelf wires 144 may then be pressed or shrunk within the openings 148 to mechanically interconnect the extruded member 121 with the side frame member 142.

Although the above-discussed shelves are adequate for many applications, in certain installations it may be desirable to provide the shelf with end frame members. In the embodiment of FIGS. 26, 27, and 28, there is illustrated a shelf 150 formed of an extruded portion 151 and a side frame member 152. As heretofore described, the extruded portion 151 includes a side frame member 153 and a plurality of shelf wires 154 integrally extruded therefrom. Moreover, in the embodiment of FIGS. 26, 27, and 28, there is provided a pair of end frame members, only one of which is illustrated in the fragmentarily drawn shelf as 155 and integrally extruded with the shelf wires 154 to join and extend integrally from the side frame member 153. The free end of the end frame member 155 adjacent the separate side frame member 152 is provided with a generally rectangular projection 155b and the side frame member 152 is provided with a complementary opening or recess 156 receiving the projection 155b. The projection 155b extends through the opening 156 in the side frame member 152 and the ends thereof are peened or crimped over, as indicated at 155c to mechanically interconnect the end frame members 155 with the separate side frame members 152. Moreover, as will be appreciated, the shelf wires 154 may have any suitable cross section and may be connected to the separate side frame member 152 in any other suitable manner.

In certain applications it may be desirable to provide and assemble separate end frame members to the shelf. A refrigerator shelf 160 is fragmentarily illustrated in FIGS. 29 and 30 employing separate end frame members 165. More specifically, the shelf 160 of the embodiment of FIGS. 29 and 30 includes an extruded portion 161, a side frame member 162, and the pair of end frame members 165. As heretofore described, the extruded portion 161 includes a side frame member 163 and a plurality of shelf wires 164 integrally extruded from the side frame member 163 and having their free end interconnected with the separate side frame member 162. The end frame member 165 has one end 165a thereof secured to the side frame member 163 of the extruded portion 161 in any suitable manner such as by a plurality of rivets 167 and has its other end 165b thereof secured to the separate side frame member 162 in any suitable manner such as by a rivet 168.

FIG. 31 fragmentarily illustrates an extruded portion 171 of a shelf wherein a pair of end frame members 175 are integrally extruded with the extruded portion 171. More specifically, the extruded portion 171 includes a side frame member 173, a plurality of shelf wires 174, and the end frame members 175. The end frame members 175 connect with the side frame member 173 by a curved portion 175a so that no sharp corners are presented to the shelf. It will be appreciated that in the impact-extruding process of forming the shelf in FIG. 31, the rounded corner 175a would be formed by a combination of extrusion and forging.

The present invention also relates to the method of forming and fabricating a shelf. FIG. 32 illustrates the method of forming the extruded portion of the shelf by an impact-extrusion method. In the practice of the present invention, the extruded portion may readily be formed on an impact-extrusion press 179, shown somewhat schematically and fragmentarily in FIG. 32 as forming the extruded portion 41 heretofore described, and including a die 180 provided with a plurality of openings or cavities 181 for forming the shelf wires to the desired shape as shown in phantom. Moreover, opposite the die 180 there is provided a punch or impact ram 182 arranged in the impact-extrusion press 179 for relative motion of the die 180 and the ram 182 relative toward each other. Moreover, the impact-extrusion press includes a confining chamber 183 for forming the integrally extruded side frame member of the extruded portion. It will be appreciated that the die 180 and the confining chamber 183 will have a sufficient length to form the entire extruded portion 41 in one operation and the die 180 will be provided with the desired number of openings or cavities 181 to provide all the shelf wires required for a single shelf. Additionally, the die 180 may have suitable openings or cavities for forming end frame members if desired.

In carrying out the formation of the extruded portion, an elongated metal billet of an extrudable material, such as aluminum, is first formed and cut to a predetermined size and the billet is confined within the confining chamber 183 of the impact-extrusion press 179. The impact ram 182 is moved relative to the die 180 to strike the billet in the confining chamber 183 and to extrude the shelf wires 44 of the extruded portion 41 and to simultaneously impact-form the integral side frame member 43 of the extruded portion. A plurality of stops 184 on the impact-ram is provided to limit the motion of the impact-ram 182 relative to the die 180. It will be appreciated that the impact-ram 182 engages the billet in the confining chamber 183 with a striking blow of considerable force so that the shelf wires and, if desired, end frame members are simultaneously extruded through the die 180 and at the same time the remainder of the billet is formed into the integrally joined side frame member of the shelf by a forging type process. After the impact-forming of the extruded member in the impact-extrusion press 179, the extruded member is removed from the impact-extrusion press and the ends of the shelf wires, as well as the ends of the end frame members, if they have been provided, are cut to desired length and the separate side frame member is secured to the free ends of the shelf wires and end frame members added, if desired, in a manner apparent from the prior discussion.

A modified impact-extrusion method is illustrated in FIG. 33 wherein the extrusion openings are in the punch or impact-ram rather than in the chamber. As therein illustrated, there is provided an impact-extrusion press 189, shown somewhat schematically and fragmentarily, for forming, for example, an extruded portion heretofore described, and including a die 190. Opposite the die 190 is provided a punch or impact ram 192 arranged in the impact extrusion press 189 for movement of the die 190 and the ram 192 relative to each other. The impact-extrusion press includes a confining chamber 193 for forming the integrally extruded side frame member of the extruded portion. Moreover, the impact ram 192 is provided with a plurality of openings or cavities 191 for forming the shelf wires to any suitable shape as shown in phantom. It will be appreciated that the die 190 and the confining chamber 193 will have a sufficient length to form the entire extruded section in one operation and the impact-ram 192 will be provided with the desired number of openings or cavities 191 to provide all the shelf wires required for a single shelf. Additionally, the impact-ram 192 may have suitable openings or cavities for forming end frame members, if desired.

In carrying out the formation of the extruded portion with the impact extrusion press illustrated in FIG. 33, an elongated metal billet of extrudable material such as aluminum is first formed and cut to a predetermined size and the billet is confined within a confining chamber 193 of the impact-extrusion press 189. The impact ram 192 is moved relative to the die 190 to strike the billet in the confining chamber 193 and to extrude the shelf wires of the extruded portion and to simultaneously impact-form the integral side frame member of the extruded portion. It will be appreciated that the impact-ram 192 engages the billet in the confining chamber 193 with a striking blow of considerable force so that the shelf wires and, if desired, end frame members are simultaneously extruded through the impact ram 192 and at the same time the remainder of the billet is formed into the integrally formed side frame member of the shelf by a forging type operation. After the impact-forming of the extruded member in the impact-extrusion press 189, the extruded member is removed from the impact-extrusion press and the ends of the shelf wires, as well as the ends of the end frame members when provided, are cut to the desired length. The separate side members are secured to the free ends of the shelf wires and integral end frame members, or separate end frame members may be added, if desired, in a manner apparent from the prior discussion.

It will be seen that a shelf according to the present invention is adapted for use as a refrigerator shelf and the like and may be quickly and economically manufactured; specifically, the shelf need only to include two parts—an extruded portion including a side frame member and a plurality of shelf wires integrally joined to and extruded from the side frame member, and a separate side frame member joined to the free end of the shelf wires. Moreover, as apparent from the numerous embodiments disclosed in this application, the present invention provides for a considerable latitude in the design of the shelf.

It is apparent from the numerous modifications and embodiments herein described that numerous other modifications and embodiments may be devised by those skilled in the art, for example, integrally formed parts such as grilles may be formed by the present invention, and it is intended by the appended claims to cover all such modifications and embodiments which will fall within the true spirit and scope of the present invention.

What is claimed as new and is desired to be secured by Letters Patent of the United States is:

1. The method of forming a refrigerator shelf and the like comprising the steps of forming an elongated metal billet to a predetermined size; confining the billet in the chamber of an impact extrusion press with a die communicating with the chamber and provided with a plurality of die cavities for forming the wires of a shelf and an impact ram at opposite ends thereof; moving the die and ram relatively toward each other with sufficient force to effect impact extrusion of a portion of the material of said billet through the die cavities to form said shelf wires while maintaining said wires connected to the remainder of the material of said billet in said chamber and simultaneously impact-forming said remainder into one side frame member of said shelf; removing said material from said press; and securing another side frame member to the ends of said shelf wires.

2. The method of forming a shelf as set forth in claim 1 above wherein the step of moving the die and ram relatively toward each other includes the step of simultaneously extrusion forming end frame members from said billet.

3. The method of forming a shelf as set forth in claim 1 above and including the step of joining end frame members to said side frame members.

4. The method of forming an extruded member comprising the steps of forming an elongated metal billet to a predetermined size; confining the billet in the chamber of an impact extrusion press with a die section communicating with the chamber and an impact ram section at opposite ends thereof; one of said sections being provided with a plurality of die cavities communicating with said chamber for forming portions of said member; moving the die and ram relatively toward each other with sufficient force to effect impact extrusion of a portion of the material of said billet through the die cavities to form said portions while maintaining said portions integrally connected to the remainder of the material of said billet in said chamber and simultaneously impact-forming said remainder into another portion of said member; and removing said material from said press.

References Cited by the Examiner

UNITED STATES PATENTS

| 2,135,766 | 11/1938 | Pierce | 29—160 |
| 2,197,982 | 4/1940 | O'Brien | 211—153 |
| 2,274,125 | 2/1942 | Carney | 211—153 |
| 2,451,099 | 10/1948 | La Motte | 29—455 X |
| 2,568,153 | 9/1951 | Hickman | 211—153 |
| 2,786,538 | 3/1957 | Blackburn et al. | 29—156.8 X |
| 2,798,284 | 7/1957 | Mudd | 29—155 |
| 2,876,910 | 3/1959 | Morton | 211—153 |
| 2,955,415 | 10/1960 | Long. | |
| 2,994,944 | 8/1961 | Prudhon | 29—155 |

JOHN F. CAMPBELL, *Primary Examiner.*

CLAUDE A. LE ROY, WHITMORE A. WILTZ,
*Examiners.*

W. D. LOULAN, T. H. EAGER, *Assistant Examiners.*